No. 873,315. PATENTED DEC. 10, 1907.
THE GREAT LAFAYETTE.
THEATRICAL DEVICE.
APPLICATION FILED JULY 1, 1905.
3 SHEETS—SHEET 2.
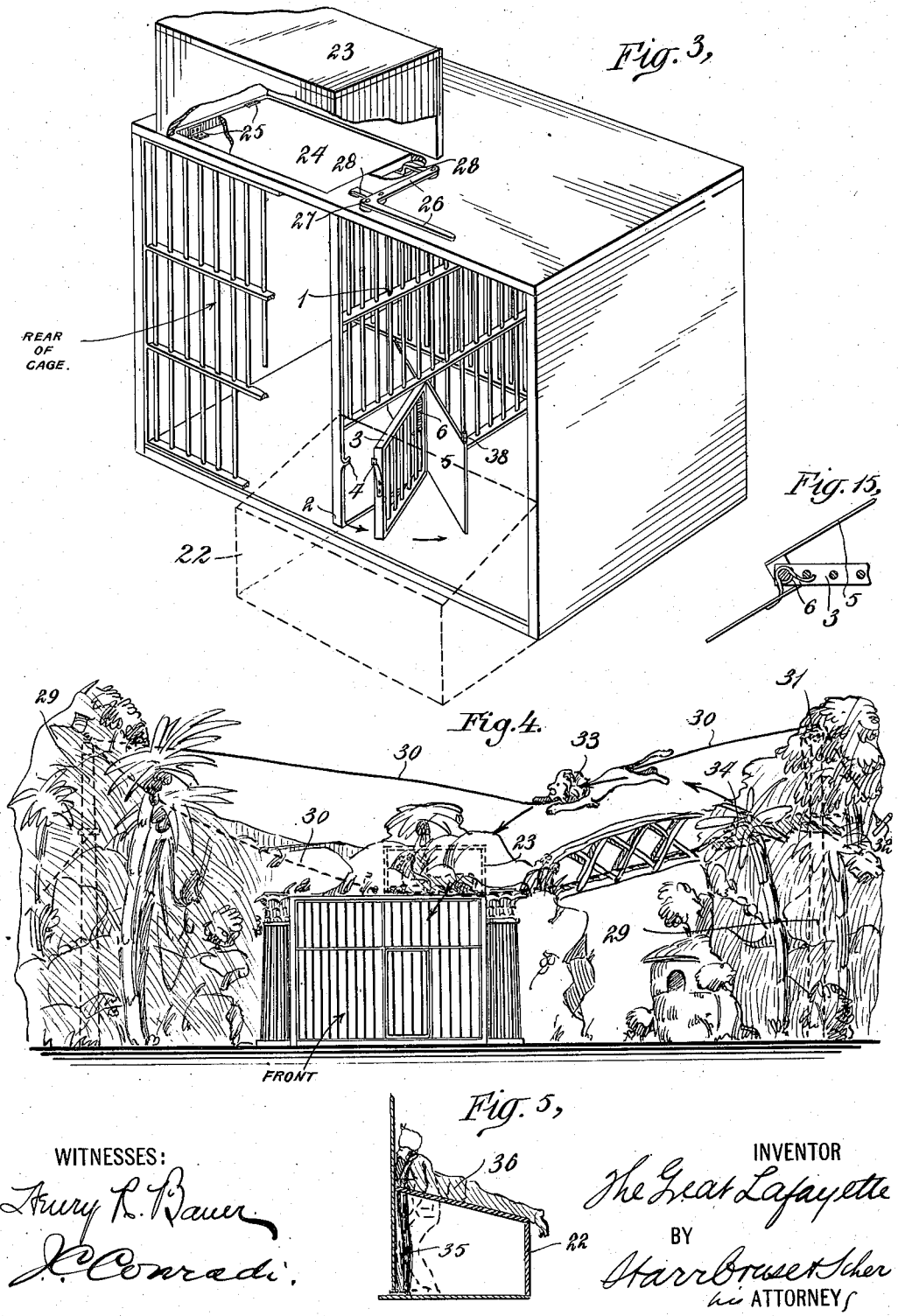

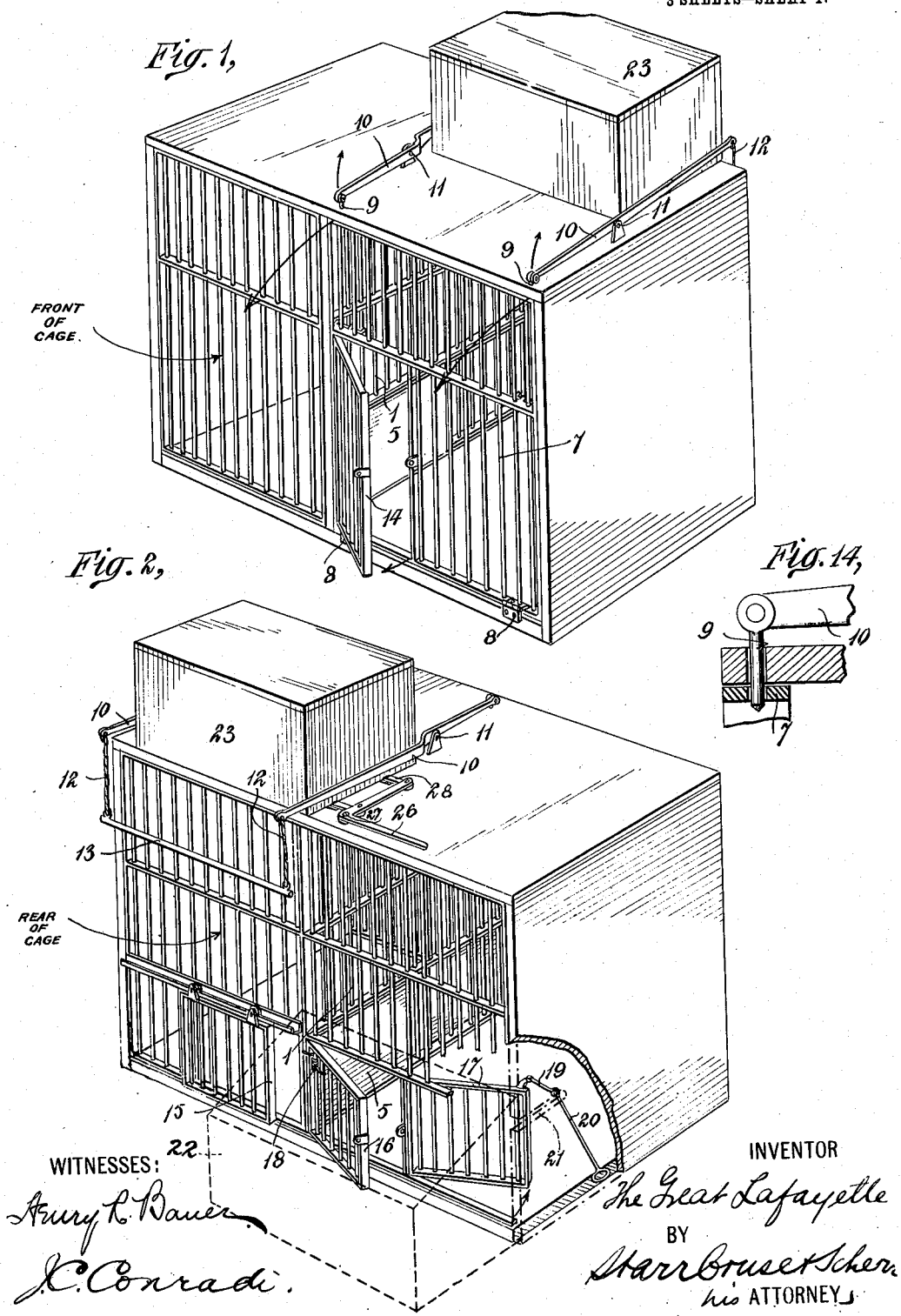

No. 873,315. PATENTED DEC. 10, 1907.
THE GREAT LAFAYETTE.
THEATRICAL DEVICE.
APPLICATION FILED JULY 1, 1905.

3 SHEETS—SHEET 3.

WITNESSES:
Henry R. Bauer
J. C. Conrad

INVENTOR
The Great Lafayette
BY
Starr Bruse & Scher
his ATTORNEYS

UNITED STATES PATENT OFFICE.

THE GREAT LAFAYETTE, OF NEW YORK, N. Y.

THEATRICAL DEVICE.

No. 873,315.   Specification of Letters Patent.   Patented Dec. 10, 1907.

Application filed July 1, 1905. Serial No. 268,010.

*To all whom it may concern:*

Be it known that I, THE GREAT LAFAYETTE, a citizen of the United States, and a resident of the borough of Brooklyn, city and State of New York, have invented certain new and useful Theatrical Devices, of which the following is a specification.

Figure 6:
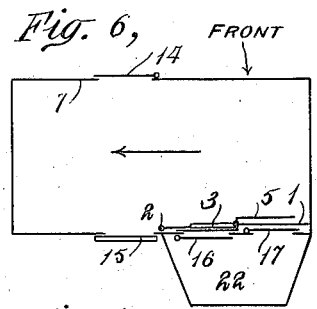
Figure 10:
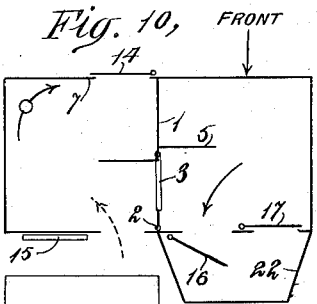
Figure 7:
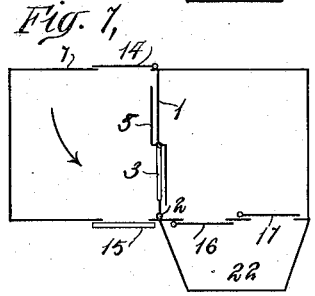
Figure 11:
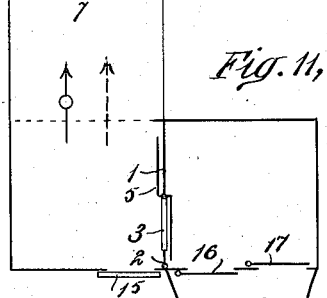
Figure 8:
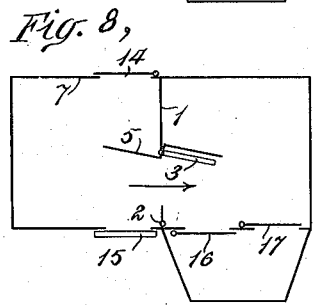
Figure 12:
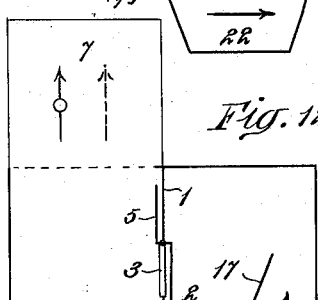
Figure 9:
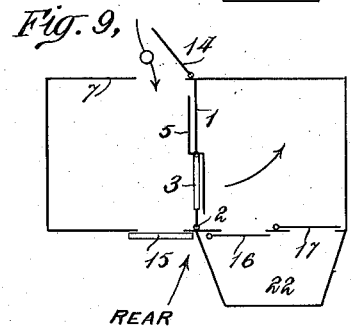
Figure 13:
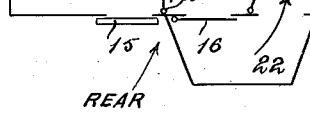

My present invention relates to theatrical devices, whereby I am able to produce the effect, first, of a lion hunt and the capture of a live lion; and, second, the feeding of a person, apparently, to said live lion. These effects I accomplish by means of the apparatus illustrated in the accompanying drawings, wherein Figure 1 is a front view of a cage embodying my invention; Fig. 2, a rear view with parts broken away to illustrate certain details and with the rear compartment shown in dotted lines; Fig. 3 a view similar to Fig. 2 with additional parts broken away to illustrate further details; Fig. 4, a scenic representation of the devices whereby I simulate the lion hunt; Fig. 5 a detail showing features hereinafter to be described; Figs. 6 to 12, inclusive, are diagrammatic views to illustrate the mode of operation of my apparatus. In these figures, Fig. 6 shows the apparatus with the lion in the main cage; Fig. 7 shows the partition closed to divide the main cage into two compartments with the lion in the left-hand compartment; Fig. 8 shows the real and the sham door in the partition open with the lion passing through into the right-hand compartment; Fig. 9 shows the real and the sham doors closed with the lion in the right-hand compartment and a person entering through an open door into the left-hand compartment; Fig. 10 shows the sham door in the partition open; it further shows the exit door for the lion into the rear compartment open with the lion passing into the said compartment; and additionally shows the entrance door for the sham animal into the left-hand side of the cage open with the sham animal entering; Fig. 11 shows the lion shut in the rear compartment and further shows the front of the left-hand side of the cage thrown down with the sham animal pouncing upon the person; Fig. 12 is the same as Fig. 11 with the exception that the lion is shown making his return entrance into the main cage and into the view of the audience through an open door between the rear compartment and the main cage. Fig. 13, a detail of a form of robe or costume used in connection with the apparatus; Fig. 14, an enlarged sectional view, partly in elevation, to illustrate the locking action of the pins 9; and Fig. 15, a top plan view of the doors in the partition of the cage shown in Fig. 3.

The accompanying drawings illustrate some of the forms which my invention may take, and in them the same numerals of reference have been used throughout to designate corresponding parts.

I will first describe the apparatus itself, and thereafter its mode of operation, and then point out the novel features in the claims.

Describing, now, the apparatus, Figs. 1, 2 and 3 show a cage of suitable proportions and strength for holding a lion. This cage is provided with a partition 1 which may be hinged at 2 to the back of the cage, the object being to be able to give the lion the freedom of the entire cage by opening the partition, or, if desired, to imprison the lion in either end of the cage by swinging the partition across the cage and locking it in place. In the rear of the partition, and at the bottom thereof, is provided a swinging grating 3 to allow the lion to pass from one side of the cage to the other when the partition is in place. In the construction shown, this grating can swing in one direction only, to-wit, in the direction of the arrow in Fig. 3. Means 4 is provided for locking the grating in closed position. A second swinging door 5 is provided, consisting of a plate of sheet iron hinged at the center, as shown, so as to make two leaves, each of approximately the size of the swinging grating. This nontransparent sheet-iron door will hereafter be called the false door, because as a matter of fact it has no real function of controlling the opening in the partition, this being done by the swinging grating 3 which, therefore, is properly termed the true door. The false door has the function of concealing this true door and of giving the audience the impression that when the false door is open, the lion is free to pass from one side of the cage to the other, although, of course, this impression is false, since the real door or grating—concealed by the false door, is shut.

A spiral spring 6 is provided (see Figs. 3 & 15), the free ends of which engage respectively with the rear side of the false door, and with the left side of the swinging grating, whereby when the false door is swung into open position by an attendant outside the cage, the spring will compel the swinging grating to follow in the same direction.

As will be seen from Fig. 1, I prefer to make the entire front 7 of the right hand side of the cage removable, the same swinging on the bottom hinges 8 and being locked and unlocked by movable pins 9 which work through holes in the top of the cage and corresponding holes in the top of the grating. It will be obvious that these pins when withdrawn will permit the entire front of this side of the cage to fall out in the direction of the arrows in Fig. 1. To operate these locking pins conveniently from the rear of the cage, I support them, as shown, from levers 10 centrally pivoted at 11 and provided at their rear ends with cords 12 to which is attached a suitable handle 13. Obviously, upon pulling this handle downward the pins will be withdrawn and the front of the cage unlocked. In this same removable front last referred to I preferably provide the swinging door 14. At the rear of the cage, and on the same side of the partition as the swinging door last referred to, I provide another door 15 which will preferably be sliding, as shown. On the other side of the partition, and also at the rear of the cage, I additionally provide the swinging doors 16 and 17. The first door 16 swings only outwardly and is controlled by a spring 18 which tends at all times to close the door automatically. The other door swings inwardly, as shown, and may be operated from the outside of the cage by any suitable device, such as that illustrated and comprising the parts 19 and 20, working through the slot or opening 21 in the side of the cage.

In Fig. 5, I show a vertical section, and in Figs. 6 to 12, a top plan view of an auxiliary box or cage 22 which is adapted to communicate with the rear of one half of the main cage, so as to receive the lion when the door 16 is open. See Fig. 10.

A box 23 is provided on top of the main cage, and is of a size suitable to contain a live lion. This box communicates at its bottom with the main cage, through a trap-door 24 in the top of said cage, whereby when said trap-door is released and allowed to swing about the hinges 25 the lion is dropped into the cage.

The means for controlling the operation of the trap-door may conveniently take the form illustrated, where 26 is an L-shaped member pivoted at 27 to the top of the cage, one arm of the L-shaped member being provided with the projecting members 28 which pass through holes in the top of the cage and project under the edge of the trap-door to act as supports. The other arm of the L-shaped member acts as a handle and when pulled to the rear, withdraws the projecting members from under the trap-door and allows same to drop.

In Fig. 4 the box 23 just described is shown in position on the top of the cage, and with a scenic representation arranged about the cage to make it look like a lion trap. As features additional to this part of the apparatus, I provide poles 29 one on each side of the cage. Between these poles I suspend a wire 30. This wire is secured to the left-hand pole and works over a pulley 31 on the right-hand pole, and its free end is provided with a handle 32. On this wire I suspend a property or dummy lion 33 in such fashion that it can freely slide along the wire. Any means that will accomplish this result may be employed, such, for instance, as screw-eyes or bolts secured to the lion with the wire passed through the eyes of the screws or bolts.

I will now describe the mode of operation of my apparatus, and will begin with the lion hunt, resulting in the capture, apparently, of a live lion. To bring about this illusion, I may employ stage settings something like that indicated in Fig. 4, the object being to give the cage the appearance of a lion trap concealed in the jungle. The box 23 on the top of the cage is shown in dotted lines and contains a live lion and will, of course, be suitably concealed from view by appropriate stage settings.

The scene will open with the hunters and the other accessories of a lion hunt and the property lion will be in the position shown in dotted lines at 34 and concealed from view behind the scenery. In the course of the hunt, the handle 32 on the end of the wire will be suddenly pulled so as to throw the lion on the wire high in the air, and make it seem to leap in full view of the audience down into the trap, the lion, of course, sliding on the wire. At the same instant the trap door in the top of the cage is released, and the live lion dropped into the cage. The combined effect on the audience will be that of a real lion leaping through the air into the trap, where he is seen captured.

Describing, now, the operation of my apparatus, whereby I produce the effect of apparently feeding a woman to a live lion, this part of the performance will preferably follow the capture of the lion, as above described, and will form part of some appropriate plot. To make clear this part of my description, I refer to the accompanying diagrammatic views, Figs. 6 to 12, inclusive. In these views the full arrow designates the live lion, the dotted arrow a man disguised as a lion, and the arrow with the circle the person, usually a woman, who is supposed to be fed to the lion. In Fig. 6 the lion is shown in the cage with the central partition folded back so as to give him the full freedom of the cage. All the appurtenances of the cage are shown diagrammatically, and are as previously described and illustrated. The actors pull forward the central partition 13 and lock it across the cage, thereby securing the lion in the left-hand compartment, as shown in Fig. 7. The real and false doors are then opened and the lion, in full view of the audience, allowed to pass through the opening in the partition into the other side of the cage, as shown in Fig. 8. Both doors are then shut. This locks the lion securely in the right-hand side of the cage, and makes it safe for the woman to be forced into the other side of the cage, through the door 14 which is now opened for this purpose. This door is then closed and the false door opened, thereby apparently to the audience opening up the hole in the partition so as to allow the lion to pass through to the woman. As a matter of fact, however, he cannot do so, because the real door 3 in the partition is closed, as shown in Fig. 10, and what he does do is to pass back of the false door and through the swinging door 16 into the box 22 behind the cage, wherein he is securely retained by said last named door springing back into closed position. At the same instant that the real lion's tail disappears behind the false door, a man disguised in a lion's skin pushes through the opening controlled by the sliding door in the other side of the cage, and emerges to the view of the audience. Thus as the real lion's tail disappears behind the false door, the sham lion's head appears to the audience on the other side of the false door, thereby creating the illusion that the real lion is passing through the opening in the partition to reach the woman. All this is shown diagrammatically in Fig. 10. The sham lion having pounced on the woman, the front of the cage falls out and then to reassure the audience the lion skin is thrown off and the trick revealed. At the same instant, the real lion is seen secure in the other side of the cage, into which he has been returned from the auxiliary cage through the door. Compare Fig. 12.

In order that the audience may not suspect the presence of the auxiliary cage 22 behind the main cage, due to the fact that the main cage on this side will be obstructed and cannot be looked through by the audience like the other side, I provide draperies 35 (see Figs. 5 & 13) of silk, or other material, between the main cage and the auxiliary cage, concealing the latter from the audience, and corresponding with the costume of one or more men 36 who appear to the audience to be standing at the back of the cage and looking through it, as indicated by the dotted lines. As a matter of fact, however, these men are lying flat on top of the auxiliary cage, being supported thereby, as shown in Fig. 5. To create this illusion of men standing behind the cage, and thereby obstructing the view of the audience through the cage, I prefer to employ draperies of the general nature shown in Fig. 13 where it will be seen to consist of a sleeved garment provided with a spring clip 37 at the neck to form a convenient means of attachment to the wearer, and being further provided with a flowing skirt portion adapted to hang down between the main cage and the auxiliary cage to conceal the presence of the latter, all as set forth above.

Obviously, I do not intend to limit myself to carrying out the above effects and illusions with a lion, since of course other animals can be substituted and the trick otherwise varied in a number of details.

What I claim is:—

1. In a theatrical device, the combination of two cage-compartments located adjacently with the division between the compartments endwise to the audience and communicating with each other by an opening; a real door adapted to control said opening; a door called for convenience an entrance door, controlling an opening in the rear wall relative to the audience of one of said compartments; a door called for convenience an exit door controlling an opening in the rear wall of the other compartment; and a false door in the partition adapted to be moved in front of the real door and to conceal from the audience said real door and also the exit and entrance doors.

2. In a theatrical device, the combination of a cage divided into two compartments by a partition located end-wise to the audience; said partition provided with an opening therethrough; a swinging real door adapted to control said opening; a swinging non-transparent false door hinged in front of said real door and adapted to conceal said door from the audience; a door adapted to control an opening in the rear wall relative to the audience of one of the compartments and concealed from the audience by the false door when the same is in open position; and a door adapted to control an opening in the rear wall of the other compartment and likewise concealed from the audience by the false door when the same is in open position.

3. In a theatrical device, the combination of two cage-compartments located adjacently with the division between them endwise to the audience; a door called for convenience an exit door, controlling an opening in the rear wall relative to the audience of one of the compartments; a door called for convenience an entrance door controlling an opening in the rear wall of the other compartment; a false door in the partition apparently controlling an opening in said partition and adapted when in open position to conceal said exit and entrance doors from the audience.

4. In a theatrical device the combination of two cage-compartments located adjacently with the division between the compartments endwise to the audience; a nontransparent member adapted to be located transversely to the division between the compartments and to project into their respective interiors; a door adapted to control an opening in the rear wall relative to the audience of one of the compartments and located behind the non-transparent member; and a door adapted to control an opening in the rear wall of the other compartment and located behind the non-transparent member.

5. In a theatrical device the combination of two cage-compartments located adjacently with the division between the compartments endwise to the audience; a non-transparent member adapted to be located transversely to the division between the compartments and to project into their respective interiors; a door called for convenience an entrance door adapted to control an opening in the rear wall relative to the audience of one of the compartments and located behind the non-transparent member; a door called for convenience an exit door adapted to control an opening in the rear wall of the other compartment and located behind the non-transparent member; and a third compartment located behind the cage-compartment having the exit door and in communication therewith.

6. In a theatrical device the combination of two cage-compartments located adjacently with the division between the compartments endwise to the audience; a non-transparent member adapted to be located transversely to the division between the compartments and to project into their respective interiors; a door called for convenience an entrance door adapted to contol an opening in the rear wall relative to the audience of one of the compartments and located behind the non-transparent member; a door called for convenience an exit door adapted to control an opening in the rear wall of the other compartment and located behind the non-transparent member; a third compartment located behind the cage-compartment having the exit door and in communication therewith; and material in front of said third compartment adapted to conceal said compartment from the audience and to appear to be part of the costume of a person behind the cage.

7. In a theatrical device the combination of two cage-compartments located adjacently with the division between the compartments endwise to the audience; a non-transparent member adapted to be located transversely to the division between the compartments and to project into their respective interiors; a door called for convenience an entrance door adapted to control an opening in the rear wall relative to the audience of one of the compartments and located behind the non-transparent member; a door called for convenience an exit door adapted to control an opening in the rear wall of the other compartment and located behind the non-transparent member; a low compartment located behind the cage-compartment having the exit door and in communication therewith, the said low compartment being adapted to support a person on its top in prone position looking through the cage toward the audience; and material in front of said low compartment adapted to conceal it from the audience and to appear to be part of the costume of the person lying on top of the low compartment.

8. In a theatrical device the combination of two cage-compartments located adjacently with the division between the compartments endwise to the audience and communicating with each other by an opening; a door adapted to close said opening; a door called an entrance door controlling an opening in the rear wall relative to the audience of one of said compartments; a door called an exit door adapted to control an opening in the rear wall of the other compartment and arranged to swing outwardly into a third compartment located behind the compartment having the exit door; said third compartment; means adapted automatically to close the exit door; and a false door apparently controlling the opening between the two cage-compartments and adapted to conceal the exit and entrance doors from the audience.

In testimony whereof, I have signed my name to this specification in the presence of two subscribing witnesses.

THE GREAT LAFAYETTE.

Witnesses:
E. W. SCHERR, Jr.,
HENRY R. BAUER.